United States Patent
Miyamoto et al.

(10) Patent No.: US 10,059,842 B2
(45) Date of Patent: Aug. 28, 2018

(54) POLYAMIDE RESIN COMPOSITION AND MOLDED ARTICLE COMPRISING SAME

(71) Applicant: UBE INDUSTRIES, LTD., Ube-shi, Yamaguchi (JP)

(72) Inventors: Akio Miyamoto, Ube (JP); Masuaki Ichikawa, Ube (JP); Hiroki Akatsu, Ube (JP); Yutaka Matsudomi, Ube (JP)

(73) Assignee: UBE INDUSTRIES, LTD., Ube-Shi (JP)

(*) Notice: Subject to any disclaimer, the term of this patent is extended or adjusted under 35 U.S.C. 154(b) by 0 days.

(21) Appl. No.: 15/322,937

(22) PCT Filed: Jun. 29, 2015

(86) PCT No.: PCT/JP2015/068600
§ 371 (c)(1),
(2) Date: Dec. 29, 2016

(87) PCT Pub. No.: WO2016/002682
PCT Pub. Date: Jan. 7, 2016

(65) Prior Publication Data
US 2017/0137622 A1    May 18, 2017

(30) Foreign Application Priority Data

Jun. 30, 2014 (JP) .................. 2014-134573

(51) Int. Cl.
C08L 77/00 (2006.01)
C08L 77/02 (2006.01)

(52) U.S. Cl.
CPC .......... C08L 77/02 (2013.01); C08L 2203/20 (2013.01); C08L 2205/02 (2013.01)

(58) Field of Classification Search
None
See application file for complete search history.

(56) References Cited

U.S. PATENT DOCUMENTS

| 5,168,108 A * | 12/1992 | Chacko ................ C08J 5/18 524/538 |
| 2010/0219381 A1 | 9/2010 | Jeschke et al. |
| 2011/0281051 A1 | 11/2011 | Dufaure et al. |
| 2013/0187080 A1 | 7/2013 | Miyamoto et al. |

FOREIGN PATENT DOCUMENTS

| CN | 103140552 A | 6/2013 |
| EP | 1842879 A1 | 10/2007 |
| JP | 11-148007 A | 6/1999 |
| JP | 2009-185151 A | 8/2009 |
| JP | 2010-535876 A | 11/2010 |
| JP | 2011-57932 A | 3/2011 |
| JP | 2012-509972 A | 4/2012 |
| JP | 2012-144626 A | 8/2012 |
| JP | 2012-153798 A | 8/2012 |
| WO | WO 2012/161064 A1 | 11/2012 |

OTHER PUBLICATIONS

International Search Report, issued in PCT/JP2015/068600 (PCT/ISA/210), dated Sep. 8, 2015.
Extended European Search Report, dated Jan. 24, 2018, for European Application No. 15815340.3.
Office Action translation dated May 17, 2018 in Chinese Patent Application No. 201580035629.2, with English translation.

* cited by examiner

*Primary Examiner* — Ana L. Woodward
(74) *Attorney, Agent, or Firm* — Birch, Stewart, Kolasch & Birch, LLP

(57) ABSTRACT

The present invention relates to a polyamide resin composition, which not only demonstrates superior mechanical properties but also has favorable moldability and superior thermal conductivity, wherein the polyamide resin composition comprises (A) a polyamide resin, (B) glass fibers, (C) a thermally conductive filler, and (D) a polyamide elastomer, and the amount of the component (B) based on 100 parts by mass of the total amount of the components (A), (B), (C) and (D) is 9 parts by mass to 35 parts by mass; and, a molded article comprising the same.

13 Claims, No Drawings

POLYAMIDE RESIN COMPOSITION AND MOLDED ARTICLE COMPRISING SAME

TECHNICAL FIELD

The present invention relates to a polyamide resin composition and a molded article comprising the same, and more particularly, to a layered product, electronic component, heat-radiating component or automobile part in the form of a molded article.

BACKGROUND ART

Since polyamide resins represented by polyamide 6 and polyamide 66 have superior heat resistance and moldability, they are used as molding materials of electrical and electronic components and the like. In these fields, considerable efforts are being made to provide more advanced functions, decrease size and reduce weight, and countermeasures against heat, which effectively allow generated heat to be dissipated to the outside, are an important issue. In the past, a known method for improving heat resistance consisted of incorporating a thermally conductive filler in a polyamide resin composition (Patent Documents 1 and 2).

PRIOR ART DOCUMENTS

Patent Documents

Patent Document 1: Japanese Unexamined Patent Publication No. H11-148007
Patent Document 2: Japanese Translation of PCT International Application Publication No. 2010-535876

DISCLOSURE OF THE INVENTION

Problems to be Solved by the Invention

According to methods for incorporating thermally conductive filler in a polyamide resin composition, it is necessary to add a large amount of thermally conductive filler to a polyamide resin composition in order to further enhance thermal conductivity. However, when thermally conductive filler is added in a large amount, melt viscosity increases and not only is moldability impaired, but mechanical properties such as impact resistance tend to become poor.

An object of the present invention is to provide a polyamide resin composition, which not only demonstrates superior mechanical properties, but also has favorable moldability and superior thermal conductivity, and a molded article comprising that polyamide resin composition.

Means for Solving the Problems

As a result of conducting extensive studies to solve the aforementioned problems, the inventors of the present invention unexpectedly found that, by combining a polyamide elastomer with glass fibers incorporated for the purpose of improving mechanical properties and then incorporating in a polyamide resin composition, not only are mechanical properties improved, but thermal conductivity of the polyamide resin composition can be improved while maintaining favorable moldability, thereby leading to completion of the present invention.

The gist of the present invention is as indicated below.
Invention 1 relates to a polyamide resin composition comprising (A) a polyamide resin, (B) glass fibers, (C) a thermally conductive filler, and (D) a polyamide elastomer, wherein the amount of the component (B) based on 100 parts by mass of the total amount of the components (A), (B), (C) and (D) is 9 parts by mass to 35 parts by mass.

Invention 2 relates to a polyamide resin composition, wherein the amount of the component (D) based on 100 parts by mass of the total amount of the components (A), (B), (C) and (D) is 2 parts by mass to 12 parts by mass.

Invention 3 relates to the polyamide resin composition of Invention 1 or Invention 2, wherein the amount of the component (C) based on 100 parts by mass of the total amount of the components (A), (B), (C) and (D) is 20 parts by mass to 75 parts by mass.

Invention 4 relates to the polyamide resin composition of any one of Inventions 1 to 3, wherein the component (B) is at least one type of glass fiber selected from glass fibers having a mean fiber diameter of 6 $\mu$m to 25 $\mu$m.

Invention 5 relates to the polyamide resin composition of any one of Inventions 1 to 4, wherein the polyamide resin (A) is at least one type of polyamide resin selected from the group consisting of polyamide 6 and polyamide 12.

Invention 6 relates to the polyamide resin composition of any one of Inventions 1 to 5, wherein the component (C) is at least one type of thermally conductive filler selected from the group consisting of graphite, magnesium hydroxide, magnesium oxide, aluminum nitride, boron nitride, silicon nitride and talc.

Invention 7 relates to the polyamide resin composition of any one of Inventions 1 to 6, wherein component (D) is a polyetheramide elastomer.

Invention 8 relates to the polyamide resin composition of any one of Inventions 1 to 7, further comprising (E) a polyhydric alcohol.

Invention 9 relates to the polyamide resin composition of Invention 8, wherein the component (E) is pentaerythritol.

Invention 10 relates to the polyamide resin composition of any of Inventions 1 to 7, consisting of components (A), (B), (C) and (D).

Invention 11 relates to the polyamide resin composition of Invention 10, further containing only a polyhydric alcohol (E).

Invention 12 relates to the polyamide resin composition of Invention 11, wherein the component (E) is pentaerythritol.

Invention 13 relates to the polyamide resin composition of any one of Inventions 10 to 12, further containing only an additive as an optional component.

Invention 14 relates to the polyamide resin composition of Invention 13, wherein the additive contained as an optional component is at least one type of additive selected from the group consisting of a thermal stabilizer, ultraviolet absorber, photostabilizer, antioxidant, antistatic agent, lubricant, antiblocking agent, antifogging agent, nucleating agent, release agent, plasticizer, crosslinking agent, foaming agent and colorant.

Invention 15 relates to a molded article comprising the polyamide resin composition of any one of Inventions 1 to 14.

Invention 16 relates to the molded article of Invention 15, which is a layered product, electronic component, heat-radiating component or automobile part.

Effects of the Invention

According to the present invention, a polyamide resin composition, which demonstrates not only superior mechanical properties but also has favorable moldability and superior thermal conductivity, and a molded article comprising the polyamide resin composition, are provided.

BEST MEANS FOR CARRYING OUT THE INVENTION

The polyamide resin composition of the present invention contains (A) a polyamide resin, (B) glass fibers, (C) a thermally conductive filler, and (D) a polyamide elastomer.

<Polyamide Resin (A)>

There are no particular limitations on the polyamide resin (A) provided it has an amide bond (—CONH—) in the main chain thereof. The polyamide resin (A) can be obtained by polymerization or copolymerization by a known method such as melt polymerization, solution polymerization or solid-phase polymerization using a lactam, an aminocarboxylic acid, a diamine and a dicarboxylic acid (nylon salt), or a diamine and an oxalate diester as raw material.

Examples of lactams include ε-caprolactam, ω-enantholactam, ω-undecalactam, ω-laurolactam, α-pyrrolidone and α-piperidone, and ε-caprolactam and ω-laurolactam are preferable.

Examples of aminocarboxylic acids include aliphatic ω-aminocarboxylic acids such as 6-aminocaproic acid, 7-aminoheptanoic acid, 8-aminooctanoic acid, 9-aminononanoic acid, 10-aminocapric acid, 11-aminoundecanoic acid or 12-aminododecanoic acid, and 6-aminocaproic acid, 11-aminoundecanoic acid and 12-aminododecanoic acid are preferable.

Examples of diamines include aliphatic diamines such as ethylenediamine, trimethylenediamine, tetramethylenediamine, pentamethylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-methyl-1,8-octadiamine or 2,2,4- or 2,4,4-trimethylhexane-1,6-diamine, alicyclic diamines such as 1,3- or 1,4-cyclohexyldiamine, bis(4-aminocyclohexyl)methane, bis(4-aminocyclohexyl)propane, bis(3-methyl-4-aminocyclohexyl)methane, (3-methyl-4-aminocyclohexyl)propane, 1,3- or 1,4-bisaminomethylcyclohexane, 5-amino-2,2,4-trimethyl-1-cyclopentane methylamine, 5-amino-1,3,3-trimethylcyclohexane methylamine, bis(aminopropyl)piperazine, bis(aminoethyl)piperazine or norbornane dimethyleneamine, and aromatic diamines such as m- or p-xylylenediamine, and hexamethylenediamine, nonamethylenediamine and 2-methyl-1,8-octanediamine are preferable.

Examples of dicarboxylic acids include aliphatic dicarboxylic acids such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid or eicosanedioic acid, alicyclic dicarboxylic acids such as 1,3- or 1,4-cyclohexanedicarboxylic acid, dicyclohexanemethane-4,4'-dicarboxylic acid or norbornanedicarboxylic acid, and aromatic dicarboxylic acids such as isophthalic acid, terephthalic acid or 1,4-, 1,8-, 2,6- or 2,7-naphthalanedicarboxylic acid, and oxalic acid and adipic acid are preferable.

Examples of oxalate diesters include oxalate diesters of aliphatic alcohols such as dimethyl oxalate, diethyl oxalate, di-n- (or i-)propyl oxalate or di-n- (or i- or t-)butyl oxalate, oxalate diesters of alicyclic alcohols such as dicyclohexyl oxalate, and oxalate diesters of aromatic alcohols such as diphenyl oxalate, and di-n-butyl oxalate, di-i-butyl oxalate and di-t-butyl oxalate are preferable, while di-n-butyl oxalate is more preferable.

A polyamide resin which is a polymer of lactams, aminocarboxylic acids, diamines and dicarboxylic acids (nylon salts) or diamines and oxalate diesters, or is a copolymer thereof, can be used for the polyamide resin (A). The polyamide resin (A) may be used alone or two or more types may be used in combination.

Examples of polymers include polycaprolactam (polyamide 6), polyundecanelactam (polyamide 11), polydodecanelactam (polyamide 12), polyethyleneadipamide (polyamide 26), polytetramethyleneadipamide (polyamide 46), polyhexamethyleneadipamide (polyamide 66), polyhexamethyleneazelamide (polyamide 69), polyhexamethylenesebacamide (polyamide 610), polyhexamethyleneundecamide (polyamide 611), polyhexamethylenedodecamide (polyamide 612), polyhexamethyleneterephthalamide (polyamide 6T), polyhexamethyleneisophthalamide (polyamide 6I), polyhexamethylenehexahydroterephthalamide (polyamide 6T(H)), polynonamethyleneadipamide (polyamide 96), polynonamethyleneazelamide (polyamide 99), polynonamethylenesebacamide (polyamide 910), polynonamethylenedodecamide (polyamide 912), polynonamethyleneterephthalamide (polyamide 9T), polytrimethylhexamethyleneterephthalamide (polyamide TMHT), polynonamethylenehexahydroterephthalamide (polyamide 9T(H)), polynonamethylenenaphthalamide (polyamide 9N), polydecamethyleneadipamide (polyamide 106), polydecamethyleneazelamide (polyamide 109), polydecamethylenedecamide (polyamide 1010), polydecamethylenedodecamide (polyamide 1012), polydecamethyleneterephthalamide (polyamide 10T), polydecamethylenehexahydroterephthalamide (polyamide 10T(H)), polydecamethylenenaphthalamide (polyamide 10N), polydodecamethyleneadipamide (polyamide 126), polydodecamethyleneazelamide (polyamide 129), polydodecamethylenesebacamide (polyamide 1210), polydodecamethylenedodecamide (polyamide 1212), polydodecamethyleneterephthalamide (polyamide 12T), polydodecamethylenehexahydroterephthalamide (polyamide 12T(H)), polydodecamethylenenaphthalamide (polyamide 12N), polymetaxylyleneadipamide (polyamide MXD6), polymetaxylylenesuberamide (polyamide MXD8), polymetaxylyleneazelamide (polyamide MXD9), polymetaxylylenesebacamide (polyamide MXD10), polymetaxylylenedodecamide (polyamide MXD12), polymetaxylyleneterephthalamide (polyamide MXDT), polymetaxylyleneisophthalamide (polyamide MXDI), polymetaxylylenenaphthalamide (polyamide MXDN), polybis(4-aminocyclohexyl)methanedodecamide (polyamide PACM12), polybis(4-aminocyclohexyl)methaneterephthalamide (polyamide PACMT), polybis(4-aminocyclohexyl)methaneisophthalamide (polyamide PACMI), polybis(3-methyl-4-aminocyclohexyl)methanedodecamide (polyamide dimethyl PACM12), polyisophoroneadipamide (polyamide IPD6) and polyisophoroneterephthalamide (polyamide IPDT).

Examples of copolymers include caprolactam-hexamethylenediaminoadipate copolymer (polyamide 6/66), caprolactam-hexamethylenediaminoazelate copolymer (polyamide 6/69), caprolactam-hexamethylenediaminosebacate copolymer (polyamide 6/610), caprolactam-hexamethylenediaminoundecanoate copolymer (polyamide 6/611), caprolactam-hexamethylenediaminododecanoate copolymer (polyamide 6/612), caprolactam-aminoundecanoate copolymer (polyamide 6/11), caprolactam-lauryl lactam copolymer (polyamide 6/12), caprolactam-hexamethylenediaminoadipate-lauryl lactam (polyamide 6/66/12), caprolactam-hexamethylenediaminoadipate-hexamethylenediaminosebacate (polyamide 6/66/610), caprolactam-hexamethylenediaminoadipate-hexamethylenediaminododecane dicarboxylic acid (polyamide 6/66/612), polyamide 92/62, polyamide 102/62, polyamide 122/62 and caprolactam-polyisophoroneadipamide copolymer (polyamide 6/IPD6).

The polyamide resin (A) is preferably a polymer of a lactam or a polymer obtained by polycondensation of a diamine and dicarboxylic acid, the lactam polymer is preferably polyamide 6, polyamide 11 or polyamide 12, and the polymer obtained by polycondensation of a diamine and dicarboxylic acid is preferably polyamide 66, polyamide 610, polyamide 612, polyamide 1010 or polyamide 1012. Among these, the polyamide resin (A) is particularly preferably polyamide 6 or polyamide 12 from the viewpoint of molding processing.

The relative viscosity of the polyamide resin (A) as measured in compliance with JIS K-6920 in 96% by mass of sulfuric acid under conditions consisting of a polyamide concentration of 1% by mass and temperature of 25° C. is preferably 1.0 to 6.0. If relative viscosity is within this range, viscosity when melting the composition is suitable, molding is easy, and favorable mechanical properties can be imparted to the resulting molded article. Relative viscosity is preferably 1.5 to 5.0 and more preferably 1.7 to 4.5.

The polyamide resin (A) may be used alone or two or more types may be used in combination.

<Glass Fibers (B)>

Although there are no particular limitations thereon, the glass fibers (B) are preferably gathered and bundled with a binder from the viewpoint of improving compatibility between the glass fibers and polyamide resin. The binder preferably contains a urethane-based or acrylic-based binder from the viewpoint of compatibility, and these may be used in combination.

Glass fibers having a mean fiber diameter of 6 μm to 25 μm can be used for the glass fibers (B). The mean fiber diameter is preferably 6 μm to 23 μm from the viewpoints of dimensional stability and mechanical properties of a molded article comprising the polyamide resin. Glass fibers having a mean fiber diameter of 10 μm to 23 μm, for example, can be used.

The glass fibers (B) may be used alone or two or more types may be used in combination. Two or more types of glass fibers having different mean fiber diameters may be used, and thermal conductivity was unexpectedly determined to improve as a result of combining glass fibers having specific mean fiber diameters. An example of such a combination is combining glass fibers (B1) having a mean fiber diameter of 6 μm to 11 μm with glass fibers (B2) having a mean fiber diameter of 13 μm to 25 μm. The mass ratio of the glass fibers (B1) having a mean fiber diameter of 6 μm to 11 μm to the glass fibers (B2) having a mean fiber diameter of 13 μm to 25 μm ((B1):(B2)) can be made to be 1:9 to 9:1, and a mass ratio of 5:5 is preferable. Glass fibers having a mean fiber diameter of 10 μm to 11 μm are preferable for glass fibers (B1), while glass fibers having a mean fiber diameter of 13 μm to 23 μm are preferable for glass fibers (B2).

There are no particular limitations on the fiber length of the glass fibers (B), and although fiber length can be 10 μm to 10 mm, a fiber length of 50 μm to 5 mm is preferable from the viewpoint of dimensional stability of molded articles.

The glass fibers (B) may also be subjected to surface treatment. Examples of surface treatment agents include silane-based compounds, titanium-based compounds and chromium-based compounds, and silane-based compounds and titanium-based compounds are preferable from the viewpoint of improving compatibility with the polyamide resin. These surface treatment agents may be used alone or two or more types may be used in combination.

Aminosilane-based coupling agents having superior adhesion with binders are preferable for the silane-based compound, and examples thereof include
γ-aminopropyltrimethoxysilane, γ-aminopropyltriethoxysilane,
N-phenyl-γ-aminopropyltrimethoxysilane,
N-β-(aminoethyl)-γ-aminopropyltrimethoxysilane,
N-β-(aminoethyl)-γ-aminopropyltriethoxysilane, γ-aminodithiopropyltrihydroxysilane,
γ-(polyethyleneamine)propyltrimethoxysilane,
N-β-(aminoethyl)-γ-aminopropylmethyldimethoxysilane,
N-β-(aminopropyl)-γ-aminopropylmethyldimethoxysilane,
N-(trimethoxysilylpropyl)-ethylenediamine and γ-dibutylaminopropyltrimethoxysilane.

Examples of titanium-based compounds include isopropyl triisostearoyl titanate, isopropyl tri(N-aminoethyl) titanate, isopropyl tris(dioctylpyrophosphate) titanate, tetraisopropyl bis(dioctylphosphite) titanate, tetraisopropyl titanate, tetrabutyl titanate, tetraoctyl bis(ditridecylphosphite) titanate, isopropyl trioctanoyl titanate, isopropyl tridodecylbenzenesulfonyl titanate, isopropyl tri(dioctylphosphate) titanate, isopropyl tri(dioctylphosphate) ethylene titanate, isopropyl dimethacrylisostearoyl titanate, tetra(2,2-diallyloxymethyl-1-butyl) bis(ditridecylphosphite) titanate, isopropyl tricumylphenyl titanate, bis(dioctylpyrophosphate) oxyacetate titanate and isopropyl isostearoyl titanate.

Among these, N-β-(aminoethyl)-γ-aminopropyltrimethoxysilane, N-β-(aminoethyl)-γ-aminopropylmethyldimethoxysilane and γ-aminopropyltriethoxysilane are preferable.

<Thermally Conductive Filler (C)>

Examples of the thermally conductive filler (C) include, without particular limitation, metals, alloys, carbon-based materials, hydroxides, oxides and nitrides. Examples of metal powders include aluminum powder and copper powder. Examples of alloys include low-melting-point alloys. Examples of carbon-based materials include carbon and graphite. Examples of hydroxides include aluminum hydroxide and magnesium hydroxide. Examples of oxides include aluminum oxide, magnesium oxide, beryllium oxide and titanium oxide. Examples of nitrides include aluminum nitride, boron nitride and silicon nitride. Among these, graphite, magnesium hydroxide, magnesium oxide, aluminum nitride, boron nitride, silicon nitride and talc are preferable from the viewpoint of thermal conductivity. In the case of using a composition as a thermally conductive member, graphite is preferable from the viewpoints of thermal conductivity and electrical conductivity. In the case of using a composition as an insulating member, magnesium oxide, boron nitride and talc are preferable.

There are no particular limitations on the shape of the thermally conductive filler (C), and examples thereof include spheres, needles, fibers, flakes, flat plates and irregular shapes, and flakes or flat plates are preferable from the viewpoints of mechanical properties and thermal conductivity. There are no particular limitations on the mean particle diameter of the thermally conductive filler, and the mean particle diameter of the thermally conductive filler can be 0.1 μm to 200 μm. The mean particle diameter is preferably 1 μm to 100 μm, and more preferably 5 μm to 80 μm, from the viewpoint of impact resistance. Here, mean particle diameter is the volume-based median diameter as measured by laser diffraction scattering.

The thermally conductive filler (C) may be subjected to surface treatment, and examples of surface treatment agents include silane-based compounds and titanium-based compounds. The silane-based compounds and titanium-based compounds exemplified as surface treatment agents of glass fibers can be used.

The thermally conductive filler (C) may be used alone or two or more types may be used in combination.

<Polyamide Elastomer (D)>

The polyamide resin composition of the present invention can also contain a polyamide elastomer (D). Incorporation of the polyamide elastomer (D) makes it possible to further improve mechanical properties without impairing favorable thermal conductivity.

The polyamide elastomer (D) is preferably a polyamide elastomer that has a polyamide segment for the hard segment and polyether unit for the soft segment, and examples thereof include polyether ester amide elastomers, in which the hard segment and soft segment are bound by ester bonds, and polyetheramide elastomers, in which the hard segment and soft segment are bound by amide bonds.

The hard segment can be derived from a polyamide having a carboxyl group for both terminal groups, and is a segment that contains a polyamide forming unit and at least one type of dicarboxylic acid selected from the group consisting of aliphatic dicarboxylic acids, alicyclic dicarboxylic acids and aromatic dicarboxylic acids.

The polyamide forming unit in the hard segment is composed of a lactam, an aminocarboxylic acid and/or diamine and a dicarboxylic acid (nylon salt), and examples thereof include units obtained by reacting one type or two or more types of compounds selected from the group consisting of lactams, aminocarboxylic acids, and diamines and dicarboxylic acids (nylon salts).

Examples of lactams include aliphatic lactams having 5 to 20 carbon atoms such as ε-caprolactam, ω-enantolactam, ω-undecalactam, ω-lauryl lactam and 2-pyrrolidone.

Examples of aminodicarboxylic acids include aliphatic ω-aminocarboxylic acids having 5 to 20 carbon atoms such as 6-aminocaproic acid, 7-aminoheptanoic acid, 8-aminooctanoic acid, 10-aminocapric acid, 11-aminoundecanoic acid and 12-aminododecanoic acid.

Examples of diamines include diamine compounds of aliphatic diamines having 2 to 20 carbon atoms such as ethylenediamine, trimethylenediamine, tetramethylenediamine, hexamethylenediamine, heptamethylenediamine, octamethylenediamine, nonamethylenediamine, decamethylenediamine, undecamethylenediamine, dodecamethylenediamine, 2,2,4-trimethylhexane-1,6-diamine, 2,4,4-trimethylhexane-1,6-diamine or 3-methylpentane-1,5-diamine.

Among these, ω-lauryl lactam, 11-aminoundecanoic acid or 12-aminododecanoic acid is preferable from the viewpoints of dimensional stability attributable to low water absorption, chemical resistance and mechanical properties.

The dicarboxylic acid of the hard segment can be used as a molecular weight modifier. Examples of dicarboxylic acids include dicarboxylic acid compounds of aliphatic dicarboxylic acids having 2 to 20 carbon atoms such as oxalic acid, succinic acid, glutaric acid, adipic acid, pimelic acid, suberic acid, azelaic acid, sebacic acid or dodecanedioic acid. A polyamide having a carboxyl group on both terminals can be obtained by ring-opening polymerization or polycondensation of the aforementioned polyamide forming unit in the presence of dicarboxylic acid in accordance with ordinary methods.

The number average molecular weight of the hard segment is preferably 300 to 15,000, and more preferably 300 to 6,000 from the viewpoints of flexibility and moldability.

The soft segment is preferably a polyether, and examples thereof include polyethylene glycol, polypropylene glycol, poly(tetramethylene ether) glycol, and ABA-type triblock polyethers represented by the following formula (1). These can be used alone or two or more types can be used. In addition, a polyether diamine and the like can also be used that is obtained by reacting ammonia and the like with the terminal of a polyether. The number average molecular weight of the soft segment is preferably 200 to 6,000 and more preferably 650 to 2,000.

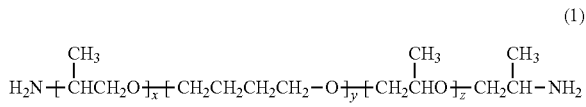

(1)

(In the formula, x represents an integer of 1 to 20, y represents an integer of 4 to 50, and z represents an integer of 1 to 20.)

In the aforementioned formula (1), x and z preferably respectively and independently represent an integer of 1 to 18, more preferably an integer of 1 to 16, even more preferably an integer of 1 to 14 and particularly preferably an integer of 1 to 12. In addition, y preferably represents an integer of 5 to 45, more preferably an integer of 6 to 40, even more preferably an integer of 7 to 35, and particularly preferably an integer of 8 to 30.

Examples of combinations of the aforementioned hard segment and soft segment include respective combinations of each of the hard segments and soft segments listed above. Among these, combinations of ring-opening polycondensates of lauryl lactam and polyethylene glycol, combinations of ring-opening polycondensates of lauryl lactam and polypropylene glycol, combinations of ring-opening polycondensates of lauryl lactam and polytetramethylene ether glycol, and combinations of ring-opening polycondensates of lauryl lactam and ABA-type triblock polyethers are preferable, while combinations of ring-opening polycondensates of lauryl lactam and ABA-type triblock polyethers are particularly preferable.

The ratio between the aforementioned hard segment and the aforementioned soft segment is such that the weight ratio of the hard segment to the soft segment is preferably 95/5 to 20/80. If the weight ratio is within this range, bleed out from molded articles is easily avoided and adequate flexibility is easily ensured. The ratio (weight ratio) of the hard segment to the soft segment is more preferably 90/10 to 30/70 and particularly preferably 80/20 to 40/60.

Examples of commercially available products of the aforementioned polyamide elastomer include Daiamide manufactured by Daicel-Evonik Ltd., Pebax manufactured by Arkema K.K., Grilamid manufactured by EMS Chemie Japan, Ltd., Hyper Alloy Actymer manufactured by Riken Technos Corp., Novamid manufactured by Mitsubishi Engineering Plastics Corp. and the UBESTA XPA series manufactured by Ube Industries, Ltd.

Among these, UBESTA XPA 9040X1, 9040F1, 9048X1, 9048F1, 9055X1, 9055F1, 9063X1, 9063F1, 9068X1, 9068F1, 9040X2, 9048X2, 9040F2 and 9048F2 (manufactured by Ube Industries, Ltd.) are preferable.

The polyamide elastomer (D) may be used alone or two or more types may be used in combination.

<Incorporated Amounts>

Although the polyamide resin composition of the present invention contains polyamide resin (A), glass fibers (B), thermally conductive filler (C) and polyamide elastomer (D), from the viewpoints of obtaining not only superior mechanical properties but also favorable moldability and superior thermal conductivity, the amount of the glass fibers (B) based on 100 parts by mass for the total amount of the components (A), (B), (C) and (D) is 9 parts by mass to 35 parts by mass. If within this range, the incorporation of the component (B) in the composition was unexpectedly found to not only improve mechanical properties, but also improve thermal conductivity while maintaining favorable moldability. This action of improving thermal conductivity can be said to be unforeseeable when considering that glass fibers normally have lower thermal conductivity than polyamide resin. The amount of the component (B) is preferably 9 parts by mass to 33 parts by mass and more preferably 15 parts by mass to 20 parts by mass.

Although the polyamide resin composition of the present invention incorporates a combination of glass fibers (B) and polyamide elastomer (D), the amount of the component (D) based on 100 parts by mass for the total amount of the components (A), (B), (C) and (D) can be made to be 2 parts by mass to 12 parts by mass, preferably 3 parts by mass to 11 parts by mass, and more preferably 4 parts by mass to 10 parts by mass.

The amount of the thermally conductive filler (C) in the polyamide resin composition of the present invention based on 100 parts by mass for the total amount of the components (A), (B), (C) and (D) can be made to be 20 parts by mass to 75 parts by mass, preferably 25 parts by mass to 60 parts by mass, and more preferably 27 parts by mass to 50 parts by mass.

<Polyhydric Alcohol (E)>

The polyamide resin composition of the present invention can contain a polyhydric alcohol (E). Incorporation of the polyhydric alcohol (E) makes it possible to improve moldability.

Although there are no particular limitations thereon, the polyhydric alcohol (E) has a melting point of 150° C. to 280° C. Here, melting point refers to the temperature of the endothermic peak (melting point) when measured by differential scanning calorimetry (DSC).

Examples of polyhydric alcohols having a melting point of 150° C. to 280° C. include pentaerythritol, dipentaerythritol and trimethylolethane. Pentaerythritol and dipentaerythritol are preferable from the viewpoint of moldability.

The polyhydric alcohol (E) may be used alone or two or more types may be used in combination.

The incorporated amount of the polyhydric alcohol (E) based on 100 parts by mass for the total amount of components (A), (B), (C) and (D) can be made to be 4 parts by mass or less, and from the viewpoint of moldability, is preferably 0.1 part by mass to 3 parts by mass and more preferably 0.5 parts by mass to 1 part by mass.

<Optional Components>

The polyamide resin composition of the present invention can incorporate an additive or additives within a range that does not impair the effects of the present invention. Examples of additives that can be added include a thermal stabilizer, ultraviolet absorber, photostabilizer, antioxidant, antistatic agent, lubricant, anti-blocking agent, antifogging agent, nucleating agent, release agent, plasticizer, crosslinking agent, foaming agent and colorant (such as a pigment or dye). Elastomers other than a polyamide elastomer can also be used.

In order to demonstrate the properties of a polyamide resin, the amount of the polyamide resin (A) based on the total weight (100% by mass) of the polyamide resin composition of the present invention is preferably 10% by mass to 75% by mass, more preferably 20% by mass to 70% by mass, and even more preferably 25% by mass to 50% by mass.

<Production Method>

The polyamide resin composition of the present invention can be prepared by melting and kneading each component. There are no particular limitations on the melting and kneading method, and may be carried out using a kneading machine such as a single-screw extruder, twin-screw extruder, kneader or Banbury mixer.

<Molded Article>

The polyamide resin composition of the present invention can be molded into a molded article using a molding processing method such as injection, extrusion or press molding. A molded article comprising the polyamide resin composition of the present invention can be used in conventional applications of polyamide resin composition molded articles, can be used as layered products, sheets or films and the like in a wide range of applications such as automobile members, computers and related equipment, optical equipment members, electrical and electronic equipment, telecommunication equipment, precision machinery, civil engineering and construction supplies, medical supplies and household supplies, and is particularly useful in applications such as electronic components, heat-radiating components and automobile parts.

EXAMPLES

Although the following provides an explanation of the present invention by indicating examples and comparative examples thereof, the present invention is not limited to the following examples.

Evaluation methods and raw materials used are indicated below.

(Raw Materials Used)

(A) Polyamide Resin (A-1) Polyamide 6 (P1011F, Ube Industries, Ltd., powder passed through 10 mesh screen, relative viscosity: 2.22)

(B) Glass Fibers (B-1) Glass fibers having a mean fiber diameter of 10.0 μm and fiber length of 3 mm containing a urethane-based binder (B-2) Glass fibers having a mean fiber diameter of 10.5 μm and fiber length of 3 mm containing a urethane-based binder (B-3) Glass fibers having a mean fiber diameter of 13 μm and fiber length of 3 min containing a urethane-based binder (B-4) Glass fibers having a mean fiber diameter of 17 μm and fiber length of 3 mm containing a urethane-based binder (B-5) Glass fibers having a mean fiber diameter of 23 μm and fiber length of 3 mm containing a urethane-based binder (B-6) Combined use of glass fibers having a mean fiber diameter of 10.5 μm and fiber length of 3 mm containing a urethane-based binder and glass fibers having a mean fiber diameter of 17 μm and fiber length of 3 mm containing a urethane-based binder at a mass ratio of 5:5

(C) Thermally Conductive Filler
(C-1) Graphite, flaked, mean particle diameter: 33 μm
(C-2) Magnesium oxide, spheres, mean particle diameter: 37 μm
(C-3) Boron nitride, plates, mean particle diameter: 38 μm
(D) Polyamide Elastomer
(D-1) Polyetheramide elastomer (UBESTA XPA P9040X1, Ube Industries, Ltd., powder obtained by crushing pellets and passing through 10 mesh screen)
(D') Other rubber components
(D'-1) Maleic acid-modified ethylene-butene resin (Tafmer MH5020, Mitsui Chemicals, Inc.)
(D'-2) Ionomer (Himilan 1855, Dupont-Mitsui Polychemicals Co., Ltd.)
(D'-3) Hydrogenated styrene-based thermoplastic elastomer (Tuftec M1913, Asahi Kasei Chemicals Corp.)
(E) Polyhydric Alcohol
(E-1) Pentaerythritol (Nippon Synthetic Chemical Industry Co., Ltd., melting point: 260° C., specific gravity: 1.4)

Each component was charged into a cylindrical mixer and mixed according to the formulations indicated in Table 1 (indicated in parts by mass). The mixtures were introduced into a TEX44 kneading machine manufactured by Japan Steel Works Ltd. at a set temperature of 280° C., screw rotating speed of 200 rpm and discharge rate of 30 kg/hr followed by extruding into strands, cooling in a water tank and using a pelletizer to obtain pellets of the polyamide resin compositions of the examples and comparative examples.

(Evaluation Methods)
(1) Kneadability
Kneadability during production of the pellets of the examples and comparative examples was evaluated in the manner indicated below.
X: Strands do not break from die to pelletizer and pellets unable to be formed
◯: Strands do not break from die to pelletizer and pellets able to be formed
(2) Fluidity
Flow length was measured using pellets of the examples and comparative examples under conditions of a cylinder temperature of 280° C., mold temperature of 80° C. and injection pressure of 100 MPa.
(3) Thermal Conductivity
Test pieces having a length of 200 mm, width of 40 mm and thickness of 5 mm were molded using the pellets of the examples and comparative examples at a cylinder temperature of 280° C. and mold temperature of 80° C. Three test pieces were superimposed by uniformly coating 5 g of a thermally conductive paste (2.4 W/(m·K)) between each test piece. Thermal conductivity was measured according to the probe method.
(4) Impact Strength
Impact strength was measured at 23° C. in compliance with ISO 179-1/1eA.

TABLE 1

| | | Example 1 | Example 2 | Example 3 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|
| Polyamide resin | (A-1) | 49.9 | 44.4 | 34.7 | 66.9 | 56.5 | 59.5 | 52.7 | 44.6 | 44.3 | 44.1 |
| Thermally conductive filler | (C-1) | 31.8 | 30.1 | 27.4 | 33.1 | 33.5 | 31.4 | 29.8 | 30.5 | 30.2 | 30.4 |
| | (C-2) | 0.0 | 0.0 | 0.0 | 0.0 | 0.0 | 0.0 | 0.0 | 0.0 | 0.0 | 0.0 |
| | (C-3) | 0.0 | 0.0 | 0.0 | 0.0 | 0.0 | 0.0 | 0.0 | 0.0 | 0.0 | 0.0 |
| Glass fibers | (B-1) | 0.0 | 0.0 | 0.0 | 0.0 | 0.0 | 0.0 | 0.0 | 0.0 | 0.0 | 0.0 |
| | (B-2) | 0.0 | 0.0 | 0.0 | 0.0 | 0.0 | 0.0 | 0.0 | 0.0 | 0.0 | 0.0 |
| | (B-3) | 9.3 | 17.5 | 32.0 | 0.0 | 0.0 | 9.2 | 17.4 | 17.7 | 17.6 | 17.7 |
| | (B-4) | 0.0 | 0.0 | 0.0 | 0.0 | 0.0 | 0.0 | 0.0 | 0.0 | 0.0 | 0.0 |
| | (B-5) | 0.0 | 0.0 | 0.0 | 0.0 | 0.0 | 0.0 | 0.0 | 0.0 | 0.0 | 0.0 |
| | (B-6) | 0.0 | 0.0 | 0.0 | 0.0 | 0.0 | 0.0 | 0.0 | 0.0 | 0.0 | 0.0 |
| Rubber component — Maleic acid-modified ethylene-butene resin | (D'-1) | 0.0 | 0.0 | 0.0 | 0.0 | 0.0 | 0.0 | 0.0 | 7.2 | 0.0 | 0.0 |
| Ionomer | (D'-2) | 0.0 | 0.0 | 0.0 | 0.0 | 0.0 | 0.0 | 0.0 | 0.0 | 7.9 | 0.0 |
| Hydrogenated styrene-based thermoplastic elastomer | (D'-3) | 0.0 | 0.0 | 0.0 | 0.0 | 0.0 | 0.0 | 0.0 | 0.0 | 0.0 | 7.8 |
| Polyamide elastomer | (D-1) | 9.1 | 8.0 | 5.9 | 0.0 | 10.1 | 0.0 | 0.0 | 0.0 | 0.0 | 0.0 |
| Polyhydric alcohol | (E-1) | 0.8 | 0.8 | 0.8 | 0.9 | 0.8 | 0.8 | 0.8 | 0.8 | 0.8 | 0.8 |
| Properties | Kneadability | ◯ | ◯ | ◯ | ◯ | ◯ | ◯ | ◯ | X | X | X |
| | Fluidity (mm) | 141 | 132 | 126 | 144 | 146 | 139 | 128 | 116 | 119 | 110 |
| | Thermal conductivity (W/(m·K)) | 2.01 | 2.27 | 2.40 | 1.90 | 1.90 | 2.00 | 2.26 | 2.09 | 2.20 | 2.13 |
| | Impact strength (kJ/m$^2$) | 6.0 | 7.4 | 7.7 | 1.5 | 3.2 | 5.1 | 5.9 | 6.1 | 6.1 | 6.3 |

| | | Example 4 | Example 5 | Example 6 | Example 7 | Example 8 | Example 9 | Example 10 |
|---|---|---|---|---|---|---|---|---|
| Polyamide resin | (A-1) | 44.4 | 44.4 | 44.4 | 44.4 | 44.4 | 45.5 | 25.9 |
| Thermally conductive filler | (C-1) | 30.1 | 30.1 | 30.1 | 30.1 | 30.1 | 30.0 | 0.0 |
| | (C-2) | 0.0 | 0.0 | 0.0 | 0.0 | 0.0 | 0.0 | 45.1 |
| | (C-3) | 0.0 | 0.0 | 0.0 | 0.0 | 0.0 | 0.0 | 11.4 |
| Glass fibers | (B-1) | 17.5 | 0.0 | 0.0 | 0.0 | 0.0 | 0.0 | 0.0 |
| | (B-2) | 0.0 | 17.5 | 0.0 | 0.0 | 0.0 | 0.0 | 13.1 |

TABLE 1-continued

|  |  |  | Example 6 | Example 7 | Example 8 | Example 9 | Example 10 | Comparative Example 6 | Comparative Example 7 |
|---|---|---|---|---|---|---|---|---|---|
|  |  | (B-3) | 0.0 | 0.0 | 0.0 | 0.0 | 0.0 | 17.5 | 0.0 |
|  |  | (B-4) | 0.0 | 0.0 | 17.5 | 0.0 | 0.0 | 0.0 | 0.0 |
|  |  | (B-5) | 0.0 | 0.0 | 0.0 | 17.5 | 0.0 | 0.0 | 0.0 |
|  |  | (B-6) | 0.0 | 0.0 | 0.0 | 0.0 | 17.5 | 0.0 | 0.0 |
| Rubber component | Maleic acid-modified ethylene-butene resin | (D'-1) | 0.0 | 0.0 | 0.0 | 0.0 | 0.0 | 0.0 | 0.0 |
|  | Ionomer | (D'-2) | 0.0 | 0.0 | 0.0 | 0.0 | 0.0 | 0.0 | 0.0 |
|  | Hydrogenated styrene-based thermoplastic elastomer | (D'-3) | 0.0 | 0.0 | 0.0 | 0.0 | 0.0 | 0.0 | 0.0 |
|  | Polyamide elastomer | (D-1) | 8.0 | 8.0 | 8.0 | 8.0 | 8.0 | 7.0 | 4.6 |
| Polyhydric alcohol |  | (E-1) | 0.8 | 0.8 | 0.8 | 0.8 | 0.8 | 0.0 | 0.6 |
| Properties |  | Kneadability | ○ | ○ | ○ | ○ | ○ | ○ | ○ |
|  |  | Fluidity (mm) | 131 | 132 | 130 | 130 | 131 | 126 | 120 |
|  |  | Thermal conductivity (W/(m·K)) | 2.33 | 2.33 | 2.23 | 2.31 | 2.32 | 2.27 | 2.08 |
|  |  | Impact strength (kJ/m$^2$) | 7.4 | 7.4 | 7.3 | 7.2 | 7.6 | 7.5 | 6.4 |

|  |  |  | Comparative Example 8 | Comparative Example 9 | Comparative Example 10 | Comparative Example 11 |
|---|---|---|---|---|---|---|
|  | Polyamide resin | (A-1) | 67.2 | 56.3 | 53.0 | 29.0 |
|  | Thermally conductive filler | (C-1) | 0.0 | 33.5 | 32.7 | 26.0 |
|  |  | (C-2) | 0.0 | 0.0 | 0.0 | 0.0 |
|  |  | (C-3) | 0.0 | 0.0 | 0.0 | 0.0 |
|  | Glass fibers | (B-1) | 0.0 | 0.0 | 0.0 | 0.0 |
|  |  | (B-2) | 20.7 | 0.0 | 4.7 | 39.8 |
|  |  | (B-3) | 0.0 | 0.0 | 0.0 | 0.0 |
|  |  | (B-4) | 0.0 | 0.0 | 0.0 | 0.0 |
|  |  | (B-5) | 0.0 | 0.0 | 0.0 | 0.0 |
|  |  | (B-6) | 0.0 | 0.0 | 0.0 | 0.0 |
| Rubber component | Maleic acid-modified ethylene-butene resin | (D'-1) | 0.0 | 0.0 | 0.0 | 0.0 |
|  | Ionomer | (D'-2) | 0.0 | 0.0 | 0.0 | 0.0 |
|  | Hydrogenated styrene-based thermoplastic elastomer | (D'-3) | 0.0 | 0.0 | 0.0 | 0.0 |
|  | Polyamide elastomer | (D-1) | 12.1 | 10.2 | 9.6 | 5.2 |
| Polyhydric alcohol |  | (E-1) | 0.9 | 0.8 | 0.8 | 0.6 |
| Properties |  | Kneadability | ○ | ○ | ○ | X |
|  |  | Fluidity (mm) | 337 | 214 | 171 | 82 |
|  |  | Thermal conductivity (W/(m·K)) | 0.36 | 1.70 | 1.95 | 2.84 |
|  |  | Impact strength (kJ/m$^2$) | 9.4 | 1.8 | 3.8 | 5.7 |

The polyamide resin compositions of the examples were determined to have favorable productivity and be able to enhance thermal conductivity without impairing moldability as well as improve impact resistance. As a result of comparing Example 1 with Comparative Examples 2 and 3 and comparing Example 2 with Comparative Examples 2 and 4, these effects were determined to be due to incorporating a polyamide elastomer as well as a specific amount of glass fibers in the polyamide resin compositions. Such effects were not obtained in Comparative Examples 5 to 7, in which a rubber component other than the polyamide elastomer was used. In addition, as a result of comparing Examples 1 to 10 with Comparative Examples 1 to 4, 8 and 9, it was determined that the desired effects of the present invention cannot be obtained in the case of a polyamide resin composition missing at least one of the polyamide resin, glass fibers, thermally conductive filler and polyamide elastomer. Moreover, as a result of comparing Examples 1 to 10 with Comparative Examples 10 and 11, it was determined that, even if a polyamide resin composition contains polyamide resin, glass fibers, thermally conductive filler and polyamide elastomer, the desired effects of the present invention cannot be obtained if the polyamide resin composition does not contain the glass fibers in an amount within a specific range.

INDUSTRIAL APPLICABILITY

According to the present invention, a polyamide resin composition, which not only demonstrates superior mechanical properties but also has favorable moldability and superior thermal conductivity, and a molded article comprising that polyamide resin composition, are provided. A molded article comprising the polyamide resin composition of the present invention can be used in conventional polyamide resin composition molded article applications, and can be used as layered products, sheets or films and the like in a wide range of applications such as automobile members, computers and related equipment, optical equipment members, electrical and electronic equipment, telecommunication equipment, precision machinery, civil engineering and construction supplies, medical supplies and household supplies, and is particularly useful in applications such as electronic components, heat-radiating components and automobile parts.

The invention claimed is:

1. A polyamide resin composition, comprising: (A) a polyamide resin, (B) glass fibers, (C) a thermally conductive filler, and (D) a polyamide elastomer, wherein:
the amount of each of the components (B), (C) and (D) based on 100 parts by mass of the total amount of components (A), (B), (C) and (D) is 9 parts by mass to 35 parts by mass, 20 parts by mass to 75 parts by mass, and 2 parts by mass to 12 parts by mass, respectively,
the component (C) has the shape of flake, sphere or plate, and a mean particle diameter of 5 µm to 80 µm, and
the component (D) is a polyamide elastomer having a polyamide unit for a hard segment and a polyether unit for a soft segment wherein the soft segment is a triblock polyether represented by formula (1):

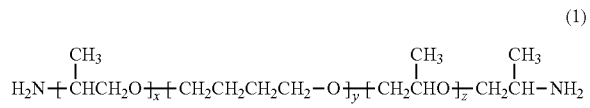

(1)

wherein x represents an integer of 1 to 20, y represents an integer of 4 to 50, and z represents an integer of 1 to 20.

2. The polyamide resin composition according to claim 1, wherein the component (B) is at least one type of glass fiber selected from glass fibers having a mean fiber diameter of 6 µm to 25 µm.

3. The polyamide resin composition according to claim 1, wherein the polyamide resin (A) is at least one type of polyamide resin selected from the group consisting of polyamide 6 and polyamide 12.

4. The polyamide resin composition according to claim 1, wherein the component (C) is at least one type of thermally conductive filler selected from the group consisting of graphite, magnesium hydroxide, magnesium oxide, aluminum nitride, boron nitride, silicon nitride and talc.

5. The polyamide resin composition according to claim 1, further comprising (E) a polyhydric alcohol.

6. The polyamide resin composition according to claim 5, wherein the component (E) is pentaerythritol.

7. The polyamide resin composition according to claim 1, consisting of components (A), (B), (C), (D), optionally (E) a polyhydric alcohol, and optionally an additive.

8. The polyamide resin composition according to claim 7, containing (E) the polyhydric alcohol.

9. The polyamide resin composition according to claim 8, wherein component (E) is pentaerythritol.

10. The polyamide resin composition according to claim 7, containing the additive.

11. The polyamide resin composition according to claim 10, wherein the additive is at least one type of additive selected from the group consisting of a thermal stabilizer, ultraviolet absorber, photostabilizer, antioxidant, antistatic agent, lubricant, anti-blocking agent, antifogging agent, nucleating agent, release agent, plasticizer, crosslinking agent, foaming agent and colorant.

12. A molded article comprising the polyamide resin composition of claim 1.

13. The molded article according to claim 12, which is a layered product, electronic component, heat-radiating component or automobile part.

* * * * *